United States Patent
Miura et al.

[11] Patent Number: 6,052,687
[45] Date of Patent: Apr. 18, 2000

[54] RELATIONAL DATABASE SEARCH SYSTEM AND METHOD, AND INTERMEDIATE LINK TABLE GENERATING METHOD AND STORAGE MEDIUM

[75] Inventors: Iwao Miura; Youko Sakaki, both of Kawasaki, Japan

[73] Assignee: Fujitsu Limited, Kawasaki, Japan

[21] Appl. No.: 08/990,578

[22] Filed: Dec. 15, 1997

[30] Foreign Application Priority Data

Jun. 13, 1997 [JP] Japan ................................ 9-156197

[51] Int. Cl.⁷ .................................................. G06F 17/30
[52] U.S. Cl. ............................ 707/100; 707/3; 707/506; 364/283.4
[58] Field of Search ................ 707/1–10, 100–104, 707/200–206; 395/701, 705; 710/7, 20, 21; 711/216, 148, 150

[56] References Cited

U.S. PATENT DOCUMENTS

| | | | |
|---|---|---|---|
| 5,355,472 | 10/1994 | Lewis | 707/101 |
| 5,519,859 | 5/1996 | Grace | 707/3 |
| 5,604,899 | 2/1997 | Doktor | 707/3 |
| 5,617,567 | 4/1997 | Doktor | 707/2 |
| 5,652,882 | 7/1997 | Doktor | 707/201 |
| 5,742,806 | 4/1998 | Reiner et al. | 707/3 |

FOREIGN PATENT DOCUMENTS 60-7556   1/1985   Japan .

*Primary Examiner*—Ruay Lian Ho
*Attorney, Agent, or Firm*—Staas & Halsey LLP

[57] ABSTRACT

Preliminarily or according to amendment to a basic table, an intermediate link table indicating a link condition for directly or indirectly linking two optional basic tables is automatically generated by obtaining an indirect link condition for linking basic tables which cannot be directly linked based on a link condition of basic tables which can be directly linked. By only inputting minimal information, a structured query language (SQL) statement is automatically generated according to the input information using the intermediate link table. Thus a relational database can be searched for desired data even when a user does not fully understand the structure of a table or field information in the relational database.

25 Claims, 20 Drawing Sheets

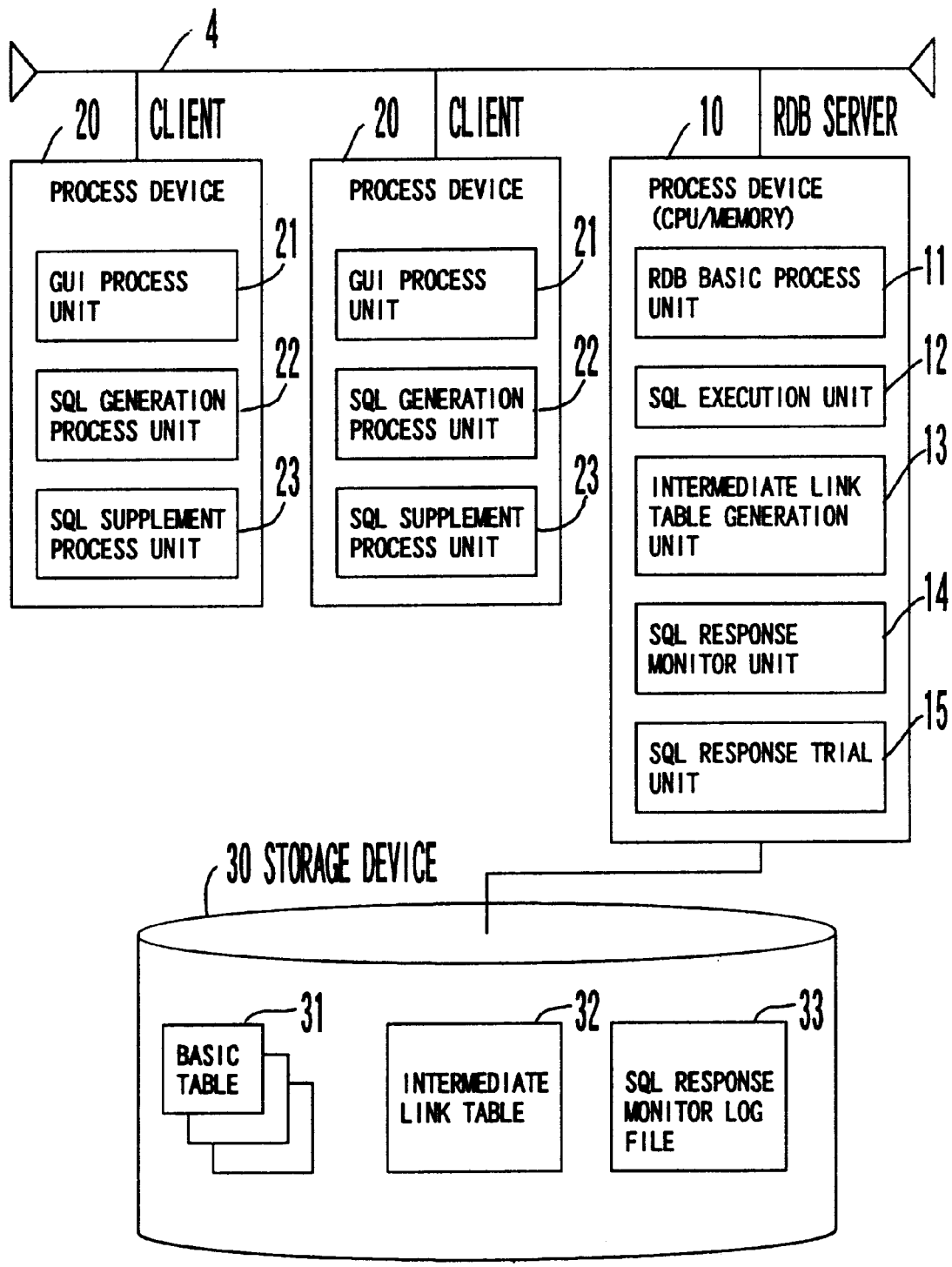
F I G. 2

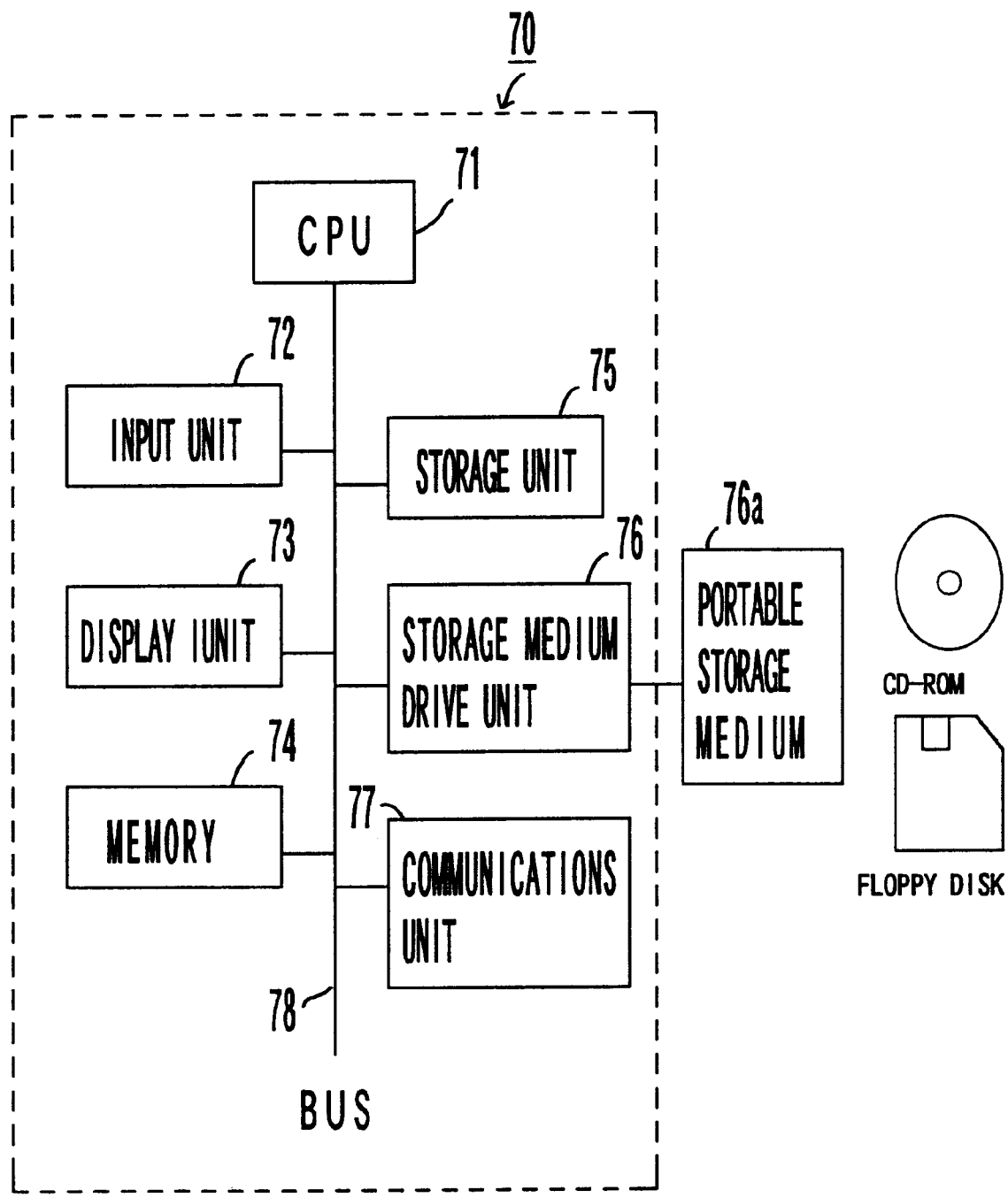
F I G. 4

⟨TABLE NAME: TECT⟩

| FIELD NAME | ATTRIBUTE | DATA | REMARKS |
|---|---|---|---|
| ZUB | CH(04) | ZUB-1 | FIGURE NUMBER |
| BUN | CH(02) | AA | CLASSIFICATION |
| MEI | CH(30) | | NAME |
| | | | |

⟨TABLE NAME: IPPANT⟩

| FIELD NAME | ATTRIBUTE | DATA | REMARKS |
|---|---|---|---|
| KAI | CH(08) | KAI001 | CIRCUIT SYMBOL |
| ZUB | CH(04) | ZUB-1 | FIGURE NUMBER |
| TNEN | CH(08) | | REGISTRATION DATE |
| | | | |

⟨TABLE NAME: SOURCET⟩

| FIELD NAME | ATTRIBUTE | DATA | REMARKS |
|---|---|---|---|
| KAI | CH(08) | KAI001 | CIRCUIT SYMBOL |
| KRAN | CH(01) | | BASIC RANK |
| TEHS | CH(02) | | ADDITIONAL NUMBER |
| TEH | CH(24) | TEH-01 | ARRANGEMENT SPECIFICATION |
| GAI | CH(01) | | EXTERNALLY PURCHASED PRODUCT |
| HINS | CH(02) | | PRODUCT NUMBER ADDTIONAL NUMBER |
| MAK | CH(03) | | ABBREVIATION FOR MANUFACTURER |
| | | | |

⟨TABLE NAME: MAKER⟩

| FIELD NAME | ATTRIBUTE | DATA | REMARKS |
|---|---|---|---|
| MAK | CH(03) | | ABBREVIATION FOR MANUFACTURER |
| MAKM | CH(50) | | MANUFACTURER NAME (ENGLISH) |
| MAKK | CH(50) | | MANUFACTURER NAME (JAPANESE) |
| MTOU | CH(06) | | REGISTRAR NAME |

F I G. 5

| SOURCE TABLE NAME | DESTINATION TABLE NAME | LINK TABLE NAME | LINK CONDITION |
|---|---|---|---|
| TECT | IPPANT | | (A)<br>TECT. ZUB = IPPANT. ZUB |
| TECT | SOURCET | IPPANT | (B)<br>TECT. ZUB = IPPANT. ZUB<br>IPPANT. KAI = SOURCET. KAI |
| TECT | MAKER | IPPANT<br>SOURCET | TECT. ZUB = IPPANT. ZUB<br>IPPANT. KAI = SOURCET. KAI<br>SOURCET. MAK = MAKER. MAK |
| IPPANT | TECT | | IPPANT. ZUB = TECT. ZUB |
| IPPANT | SOURCET | | IPPANT. KAI = SOURCET. KAI |
| IPPANT | MAKER | SOURCET | IPPANT. KAI = SOURCET . KAI<br>SOURCET. MAK = MAKER. MAK |
| SOURCET | TECT | IPPANT | SOURCET. KAI = IPPANT. KAI<br>IPPANT. ZUB = TECT. ZUB |
| SOURCET | IPPANT | | SOURCET. KAI = IPPANT. KAI |
| SOURCET | MAKER | | SOURCET. MAK = MAKER. MAK |
| MAKER | TECT | SOURCET<br>IPPANT | MAKER. MAK = SOURCET. MAK<br>SOURCET. KAI = IPPANT. KAI<br>IPPANT. ZUB = SOURCET. ZUB |
| MAKER | IPPANT | SOURCET | MAKER. MAK = SOURCET. MAK<br>SOURCET. KAI = IPPANT. KAI |
| MAKER | SOURCET | | MAKER. MAK = SOURCET. MAK |

FIG. 6

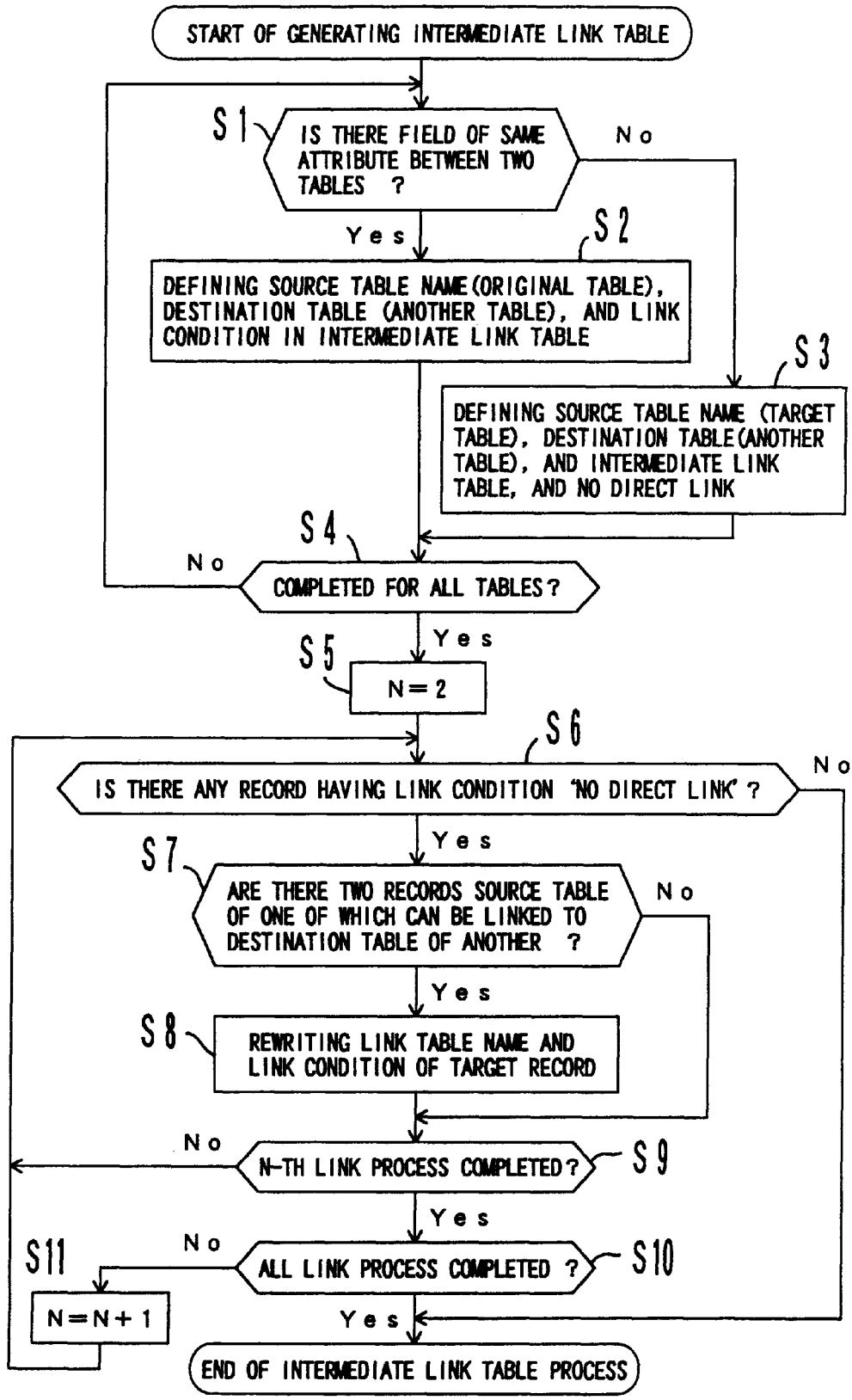
F I G. 7

⟨TABLE NAME: TECT⟩
| FIELD NAME | ATTRIB-UTE | DATA | ... |
|---|---|---|---|
| ZUB | CH(04) | ZUB-1 | |
| BUN | CH(02) | AA | |
| MEI | CH(30) | | |
| | | | |
⟨TABLE NAME: IPPANT⟩
| FIELD NAME | ATTRIB-UTE | DATA | ... |
|---|---|---|---|
| KAI | CH(08) | KAI001 | |
| ZUB | CH(04) | ZUB-1 | |
| TNEN | CH(30) | | |
| | | | |
⟨TABLE NAME: SOURCET⟩
| FIELD NAME | ATTRIB-UTE | DATA | ... |
|---|---|---|---|
| KAI | CH(08) | KAI001 | |
| KRAN | CH(01) | | |
| TEHS | CH(02) | | |
| TEH | CH(24) | TEH-01 | |
| GAI | CH(01) | | |
| HINS | CH(02) | | |
| MAK | CH(03) | | |
| | | | |
⟨TABLE NAME: MAKER⟩
| FIELD NAME | ATTRIB-UTE | DATA | ... |
|---|---|---|---|
| MAK | CH(03) | | |
| MAKM | CH(50) | | |
| MAKK | CH(50) | | |
| MTOU | CH(06) | | |
① : PRIMARY LINK
FIG. 8A
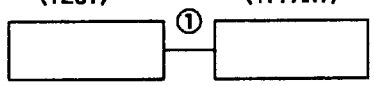
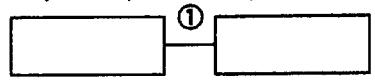
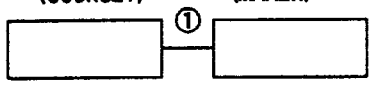
FIG. 8B

⟨INTERMEDIATE LINK TABLE⟩

| | SOURCE TABLE NAME | DESTINATION TABLE NAME | LINK TABLE NAME | LINK CONDITION |
|---|---|---|---|---|
| ① | TECT | IPPANT | | TECT. ZUB = IPPANT. ZUB |
| | TECT | SOURCET | | NO DIRECT LINK |
| | TECT | MAKER | | NO DIRECT LINK |
| ① | IPPANT | TECT | | IPPANT. ZUB = TECT. ZUB |
| ① | IPPANT | SOURCET | | IPPANT. KAI = SOURCET. KAI |
| | IPPANT | MAKER | | NO DIRECT LINK |
| | SOURCET | TECT | | NO DIRECT LINK |
| ① | SOURCET | IPPANT | | SOURCET. KAI = IPPANT. KAI |
| ① | SOURCET | MAKER | | SOURCET. MAK = MAKER. MAK |
| | MAKER | TECT | | NO DIRECT LINK |
| | MAKER | IPPANT | | NO DIRECT LINK |
| ① | MAKER | SOURCET | | MAKER. MAK = SOURCET. MAK |

① : PRIMARY LINK

FIG. 9

⟨INTERMEDIATE LINK TABLE⟩

| | SOURCE TABLE NAME | DESTINATION TABLE NAME | LINK TABLE NAME | LINK CONDITION |
|---|---|---|---|---|
| ① | TECT | IPPANT | | TECT. ZUB = IPPANT. ZUB |
| ② | TECT | SOURCET | IPPANT | TECT. ZUB = IPPANT. ZUB<br>IPPANT.KAI = SOURCET. KAI |
| | TECT | MAKER | | NO DIRECT LINK |
| ① | IPPANT | TECT | | IPPANT. ZUB = TECT. ZUB |
| ① | IPPANT | SOURCET | | IPPANT. KAI = SOURCET. KAI |
| ② | IPPANT | MAKER | SOURCET | IPPANT. KAI = SOURCET. KAI<br>SOURCET. MAK = MAKER. MAK |
| ② | SOURCET | TECT | IPPANT | SOURCET. KAI = IPPANT. KAI<br>IPPANT. ZUB = TECT. ZUB |
| ① | SOURCET | IPPANT | | SOURCET. KAI = IPPANT. KAI |
| ① | SOURCET | MAKER | | SOURCET. MAK = MAKER. MAK |
| | MAKER | TECT | | NO DIRECT LINK |
| ② | MAKER | IPPANT | SOURCET | MAKER. MAK = SOURCET. MAK<br>SOURCET. KAI = IPPANT. KAI |
| ① | MAKER | SOURCET | | MAKER. MAK = SOURCET. MAK |

① : PRIMARY LINK

② : SECONDARY LINK

FIG. 11

⟨INTERMEDIATE LINK TABLE⟩

| | SOURCE TABLE NAME | DESTINATION TABLE NAME | LINK TABLE NAME | LINK CONDITION |
|---|---|---|---|---|
| ① | TECT | IPPANT | | TECT. ZUB = IPPANT. ZUB |
| ② | TECT | SOURCET | IPPANT | TECT. ZUB = IPPANT. ZUB<br>IPPANT. KAI = SOURCET. KAI |
| ③ | TECT | MAKER | IPPANT<br>SOURCET | TECT. ZUB = IPPANT. ZUB<br>IPPANT. KAI = SOURCET. KAI<br>SOURCET. MAK = MAKER. MAK |
| ① | IPPANT | TECT | | IPPANT. ZUB = TECT. ZUB |
| ① | IPPANT | SOURCET | | IPPANT. KAI = SOURCET. KAI |
| ② | IPPANT | MAKER | SOURCET | IPPANT. KAI = SOURCET. KAI<br>SOURECT. MAK = MAKER. MAK |
| ② | SOURCET | TECT | IPPANT | SOURECT. KAI = IPPANT. KAI<br>IPPANT. ZUB = TECT. ZUB |
| ① | SOURCET | IPPANT | | SOURCET. KAI = IPPANT. KAI |
| ① | SOURCET | MAKER | | SOURCET. MAK = MAKER. MAK |
| ③ | MAKER | TECT | SOURCET<br>IPPANT | MAKER. MAK = SOURECT. MAK<br>SOURCET. KAI = IPPANT. KAI<br>IPPANT. ZUB = SOURCET. ZUB |
| ② | MAKER | IPPANT | SOURCET | MAKER. MAK = SOURECT. MAK<br>SOURCET. KAI = IPPANT. KAI |
| ① | MAKER | SOURCET | | MAKER. MAK = SOURCET. MAK |

① : PRIMARY LINK
② : SECONDARY LINK
③ : TERTIARY LINK

FIG. 13

```
┌─────────────────────────────────────────────────────────────┐
│ ▭         A U T O M A T I C   R E T R I E V A L       ▭  □ │
├─────────────────────────────────────────────────────────────┤
│ F I L E  ( F )                                              │
├─────────────────────────────────────────────────────────────┤
│                                                             │
│  TABLE GROUP  │ PARET              ▭ │                      │
│  EDITION ITEM                    SORT                       │
│  ┌─────────────────────────────┐ ┌─────────────────────────┐│
│  │◆RETRIEVAL ◇CONDITION ◇SORT │ │◆ASCENDING ORDER ◇DECENDING ORDER││
│  └─────────────────────────────┘ └─────────────────────────┘│
│  ┌─────────────────────────────────────────────────────────┐│
│  │           P A R E T   T A B L E   L I S T              ││
│  ├─────────────────────────────────────────────────────────┤│
│  │ ◇COST    ◇ICYOMT  ◇JISCNT  ◇PANKT   ◆TECT  ◇TTT  ◇GENERAL││
│  │ ◇ERRTLST ◇IPPANT  ◇MAKER   ◇SOURCET ◇TS2   ◇TYPET       ││
│  ├─────────────────────────────────────────────────────────┤│
│  │       T E C T   F I E L D   L I S T  │◆FIELD NAME ◇REMARKS│
│  ├─────────────────────────────────────────────────────────┤│
│  │ ■ ZUB    □ SEK    □ DKNEN   □ HANS                      ││
│  │ ■ BUN    □ CHO    □ HAN4    □ KNENS                     ││
│  │ □ MEI    □ SHO    □ KNEN4   □ INS                       ││
│  │ □ MBIK   □ SKA    □ HANX                                ││
│  │ □ SNEN   □ DHAN   □ KNEX                                ││
│  ├─────────────────────────────────────────────────────────┤│
│  │ SELECTION LIST                                          ││
│  │ ┌─────────────────────────────────────────────────┐ △  ││
│  │ │  1  ZUB        TECT        FIGURE NUMBER        │    ││
│  │ │  2  BUN        TECT        CLASSIFICATION       │    ││
│  │ │                                                 │    ││
│  │ │                                                 │    ││
│  │ │                                                 │ ▽  ││
│  │ └─────────────────────────────────────────────────┘    ││
│  │ KNEN4  [TECT]  REVISION DATE 3 6 4                     ││
│  └─────────────────────────────────────────────────────────┘│
│  ┌────────────┐ ┌──────┐ ┌─────┐                            │
│  │DETERMINATION│ │RESET │ │ END │                            │
│  └────────────┘ └──────┘ └─────┘                            │
└─────────────────────────────────────────────────────────────┘
```

F I G .   1 5

```
┌─────────────────────────────────────────────────────────────────┐
│ □          A U T O M A T I C   R E T R I E V A L        □  □   │
├─────────────────────────────────────────────────────────────────┤
│ F I L E  ( F )                                                  │
│                                                                 │
│  TABLE GROUP  │ PARET              □ │                          │
│                                                                 │
│  EDITION ITEM                    SORT                           │
│  ┌──────────────────────────┐  ┌─────────────────────────────┐  │
│  │ ◇RETRIEVAL ◆CONDITION ◇SORT│  │ ◆ASCENDING ORDER ◇DESCENDING ORDER│
│  └──────────────────────────┘  └─────────────────────────────┘  │
│                                                                 │
│  ┌───────────────────────────────────────────────────────────┐  │
│  │             P A R E T   T A B L E   L I S T              │  │
│  ├───────────────────────────────────────────────────────────┤  │
│  │ ◇COST     ◇ICYOMT  ◇JISCNT  ◇PANKT  ◆TECT  ◇TTT  ◇GENERAL │  │
│  │ ◇ERRTLST ◇IPPANT  ◇MAKER   ◇SOURCET ◇TS2   ◇TYPET         │  │
│  ├─────────────────────────────────────┬─────────────────────┤  │
│  │       T E C T   F I E L D   L I S T │ ◆FIELD NAME ◇REMARKS│  │
│  ├─────────────────────────────────────┴─────────────────────┤  │
│  │  □ KAI    □ HINS   □ THIN                                 │  │
│  │  □ KRAN   □ SHIN   □ SBIK                                 │  │
│  │  □ TEHS   □ MAK    □ SMDH                                 │  │
│  │  ■ TEH    □ KAHI                                          │  │
│  │  □ GAI    □ NATU                                          │  │
│  ├───────────────────────────────────────────────────────────┤  │
│  │  SELECTION LIST                                           │  │
│  ├───────────────────────────────────────────────────────────┤  │
│  │   1 TEH         SOURCET        ARRANGEMENT            △   │  │
│  │                                SPECIFICATION             │  │
│  │                                                           │  │
│  │                                                       ▽   │  │
│  ├───────────────────────────────────────────────────────────┤  │
│  │  GAI [SOURCET]  EXTERNALLY PURCHASED PRODUCT              │  │
│  └───────────────────────────────────────────────────────────┘  │
│                                                                 │
│  │ DETERMINATION │  │ RESET │  │ E N D │                       │
└─────────────────────────────────────────────────────────────────┘
```

F I G. 1 6

| SQL STATEMENT | ISSUE DATE AND TIME | RESPONSE TIME | TRAIL |
|---|---|---|---|
| | | | COMPLETED |
| | | | NOT COMPLETED |
| | | | |
| | | | |

FIG. 18

RELATIONAL DATABASE SEARCH SYSTEM AND METHOD, AND INTERMEDIATE LINK TABLE GENERATING METHOD AND STORAGE MEDIUM

BACKGROUND OF THE INVENTION

1. Field of the Invention

The present invention relates to a relational database search system and method, and more particularly to a method of automatically generating an intermediate link table containing link information among relational database tables, and to a program storage medium.

2. Description of the Related Art

The conventional method of searching a relational database (RDB) is described below by referring to FIG. 1.

In FIG. 1, a storage device 3 stores a relational database and contains a basic table of the relational database. In FIG. 1, the storage device 3 stores, for example, a basic table 3g (table TECT), a basic table 3b (table IPPANT), and a basic table 3c (table SOURCET). A RDB server 2 manages the relational database, and includes an RDB basic process unit 2a and an SQL execution unit 2b. The RDB basic process unit 2a provides a basic process function for the relational database. The SQL execution unit 2b issues an SQL statement which is a query to the relational database. Each RDB client 1 is a user terminal which utilizes the relational database, and includes a GUI process unit 1a. The GUI process unit 1a provides a graphical user interface (GUI) for access to the relational database.

In the three above described examples, that is, the basic tables 3a, 3b, and 3c, a table TECT relates to technology and has a figure number field ZUB, a classification field BUN, a name field MEI, etc. The table IPPANT relates to a common symbol and has a circuit symbol field KAI, a figure number field ZUB, a registration date field TNEN, etc. The table SOURCET is a product information table for each circuit symbol and has a circuit symbol field KAI, a basic rank field KRAN, and an arrangement number field TEH, etc.

The table TECT and the table IPPANT are linked to each other through the field name ZUB. The table IPPANT and the table SOURCET are linked to each other through the field name KAI. The table TECT and the table SOURCET do not share any common field and therefore are not directly linked to each other.

When a user intends to extract the information in the field BUN (classification) of the table TECT using the value of TEH-10 of the field TEH (arrangement number) of the table SOURCET as a key, the following SQL statement is generated and executed by the SQL execution unit 2b.
SELECT BUN
FROM SOURCET.KAI=IPPANT.KAI AND IPPANT.ZUB=TECT.ZUB AND SOURCET.TEH='TEH-01';

where SELECT specifies an extraction item, FROM specifies a table name, and WHERE specifies a retrieval condition. In such a query statement, the information can only be extracted through the table IPPANT as an intermediate table because the table TECT and the table SOURCET have no direct link condition.

However, all common users do not constantly apprehend the links in all tables in the relational database, and may be informed of only TEH-01 (arrangement number) of data. Thus, if the user does not understand the entire relationship among all related tables, no appropriate SQL statement can be described.

Therefore, the function of easily searching a relational database by a user not familiar with the relational database is desired. In the conventional technology, the GUI process unit 1a of the RDB client 1 allows the user to input an item to be processed according to a displayed menu, etc., and to fill in a plurality of forms of standard SQL statements prepared by the GUI process unit 1a with items to be processed. Thus, the RDB server 2 is requested to execute the SQL statement.

However, in the search function provided by the conventional GUI process unit 1a using a menu, etc., extraction items and specification items of a search condition are preliminarily limited, and the user cannot optionally specify an extraction item or a retrieval condition. To allow the GUI process unit 1a to accept an optional extraction item and search condition, a sample of an SQL statement containing all possible combinations of items and conditions should be incorporated in a process logic of the GUI process unit 1a. However, this has not been practically realized.

Even if the function of the GUI process unit 1a can be flexible to some extent, it is limited to that a fixed SQL statement is allowed an optional query condition. Therefore, if the user retrieves data over a plurality of tables, he or she should be aware of the existence of an intermediate table and include it in the condition.

As described above, the user has to understand the table structure and field information in a relational database and also understand the linkage of tables and field information so that an appropriate SQL statement can be generated with an intermediate table taken into account.

If a new table is added and a link condition is changed, then an existing SQL statement and the related portion of an existing GUI process unit 1a should also be changed.

Even if an SQL statement is appropriate in syntax, information may be obtained through a plurality of link conditions, or it may be very difficult to know during the operation the deterioration of a process response with an increasing amount of time and data.

SUMMARY OF THE INVENTION

The present invention aims at providing a relational database search system capable of obtaining a desired retrieval result even when a user does not fully understand the table structure and the field information in the relational database. Furthermore, the present invention aims at providing a rapid-execution-response relational database search system.

A further object of the present invention is to provide a relational database search system capable of amending an incorrect query statement into a correct query statement if the user inputs an incorrect query statement whose specification for a link condition is insufficient, etc.

The relational database search system according to the present invention includes a basic table storage unit for storing a plurality of basic tables to be searched; an intermediate link table generation unit for automatically generating an intermediate link table indicating the link condition for directly or indirectly linking two optional basic tables stored in the basic table storage unit; and an intermediate link table storage unit for storing an intermediate link table generated by the intermediate link table generation unit.

Thus, by generating and storing an intermediate link table indicating each of the link conditions between the basic tables, the user, etc. can generate an appropriate SQL statement using the above described intermediate link table only by inputting simple selection data in order to retrieve desired information.

The relational database search system according to the present invention further includes an SQL response trial unit for automatically generating quicker response SQL statements when a plurality of SQL statements that output the same retrieval result in response to given selection information can be generated.

The relational database search system according to the present invention further comprises an SQL statement correction unit for determining whether or not an input SQL statement is correct, and correcting an incorrect SQL statement if the SQL statement is incorrect.

BRIEF DESCRIPTION OF THE DRAWINGS

FIG. 2 shows the configuration (1) according to the present invention;

FIG. 4 shows an example of the configuration of the hardware;

FIG. 5 shows an example of the linkage of basic tables;

FIG. 6 shows an example of intermediate link table;

FIG. 7 is a flowchart showing an intermediate link table generating process;

FIGS. 8A and 8B show examples of the primary link;

FIG. 9 shows an example of an intermediate link table;

FIG. 11 shows an example of an intermediate link table;

FIG. 13 shows an example of an intermediate link table;

FIG. 15 shows an example (1) of an input screen of the GUI process unit;

FIG. 16 shows an example (2) of an input screen of the GUI process unit;

FIG. 18 shows an example of the configuration of the SQL response monitor log file;

DESCRIPTION OF THE PREFERRED EMBODIMENTS

Figure 1:
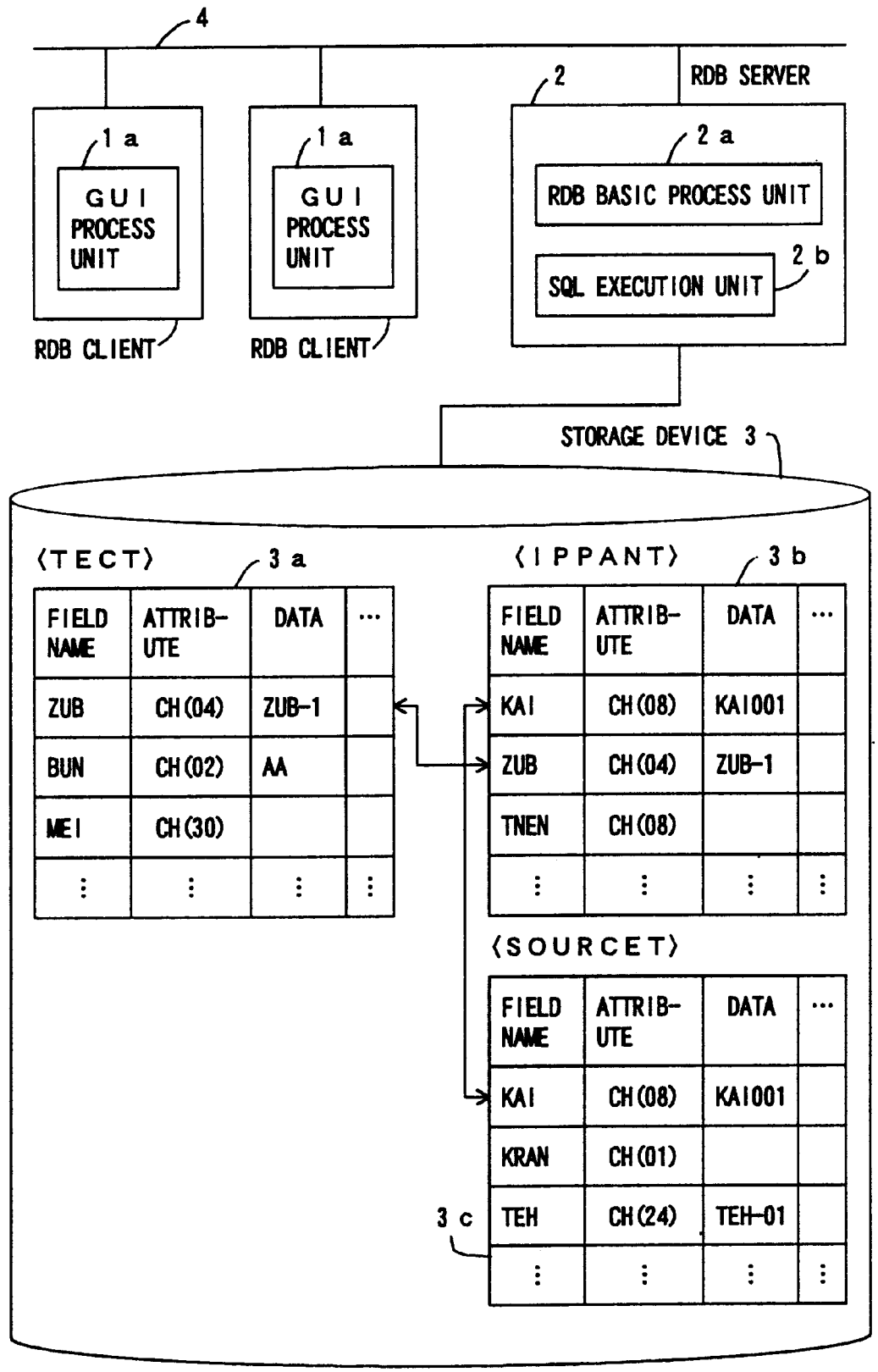
FIG. 1 shows an example of the conventional search system.

FIG. 2 shows an example (1) of the configuration of the relational database system according to the present invention. In FIG. 2, an RDB server 10 manages a relational database. An RDB basic process unit 11 provides a basic process function for the relational database. An SQL execution unit 12 executes an SQL statement. An intermediate link table generation unit 13 generates an intermediate link table containing link information about the relationship between tables. An SQL response monitor unit 14 monitors the execution response of an SQL statement. An SQL response trial unit 15 makes a trial with the retrieval condition amended within the range in which an equal result can be obtained using an SQL statement. Each client 20 is a user terminal which utilizes a relational database (RDB). A GUI process unit 21 provides a graphical user interface for access to the relational database. An SQL generation process unit 22 automatically generates an SQL statement. An SQL supplement process unit 23 adds a description when the description of a retrieval condition in an SQL statement is insufficient. A storage device 30 can be a disk device, a semiconductor storage device, etc. Each basic table 31 is a target to be retrieved from a relational database. An intermediate link table 32 contains link information about the relationship between tables. An SQL response monitor log file 33 stores information about the execution response of an SQL statement.

The RDB server 10 and each client 20 functions through a process unit comprising a CPU and memory connected through a network.

The RDB basic process unit 11 manages a relational database (RDB). The SQL execution unit 12 executes a query statement described in structured query language (SQL) for the RDB. These units are similar to those in the conventional technology.

When a table is related to another table in all basic tables 31 directly or through one or more tables using a common field, the intermediate link table generation unit 13 automatically generates a table containing the link information about the relationship between the tables, and stores it as the intermediate link table 32 in the storage device 30.

When an SQL statement is executed by the SQL execution unit 12, the SQL response monitor unit 14 measures the response time of the executed SQL statement. If the response time exceeds a reference time predetermined by the system, the SQL statement, the issue date and time, and the response time are stored in the SQL response monitor log file 33.

The SQL response trial unit 15 changes the query condition in the SQL statement stored in the SQL response monitor log file 33 into another representation within a range in which an equal query result can be obtained, and then executes the SQL statement. If the response time is shorter than a predetermined time or the response time stored in the SQL response monitor log file 33, then the SQL response trial unit 15 updates the corresponding condition in the link information in the intermediate link table 32 in the SQL statement into the above described other representation for quicker response time. An issue test of an SQL statement whose query condition has been changed is performed on all possible combinations of link conditions that output the same result.

Through the GUI process unit 21, a user inputs selection information for use in generating an SQL statement. Especially, the GUI process unit 21 of this system needs only inputting the minimal selection information about the table, field, and condition.

The SQL generation process unit 22 refers to the link information in the intermediate link table 32 generated by the intermediate link table generation unit 13 of the RDB server 10 based on the selection information input from the GUI process unit 21, generates a normal SQL statement, and requests the RDB server 10 to execute the SQL statement.

When the SQL supplement process unit 23 receives a notification from the RDB basic process unit 11 about the user-input SQL statement that the SQL statement is not normal, it refers to the link information about the intermediate link table 32 and corrects the SQL statement.

When basic tables 31 are added or removed, the intermediate link table generation unit 13 checks the relationship between the tables in all basic tables 31, generates or updates the link condition based on the table name and field name in the basic table 31, and stores the link information including a link condition in the intermediate link table 32.

When selection information for use in generating an SQL statement is input from the GUI process unit 21, the SQL generation process unit 22 refers to the link information in the intermediate link table 32. Necessary link information is obtained to generate an SQL statement describing a necessary table name and link condition, and the SQL statement is issued to the RDB server 10. The issued SQL statement is passed to the SQL execution unit 12 through the RDB basic process unit 11, and is then executed.

When an SQL statement is input from the GUI process unit 21 or other client processes to the RDB server 10, the input SQL statement is checked by the RDB basic process unit 11. As a result, when a notification that the SQL statement is incomplete, the SQL supplement process unit 23 adds necessary link information by referring to the link information in the intermediate link table 32, issues a new SQL statement, and returns it to the RDB basic process unit 11.

Thus, a correct and complete SQL statement can be issued by automatically generating and using the intermediate link table 32.

The response of the generated SQL statement at the execution of the SQL statement is checked by the SQL response monitor unit 14 and the SQL response trial unit 15. Then, the link condition in the intermediate link table 32 is updated in a way that the execution performance can be improved. Thus, the performance of the SQL statement generated or corrected using the link condition in the intermediate link table 32 can be improved.

Figure 3:
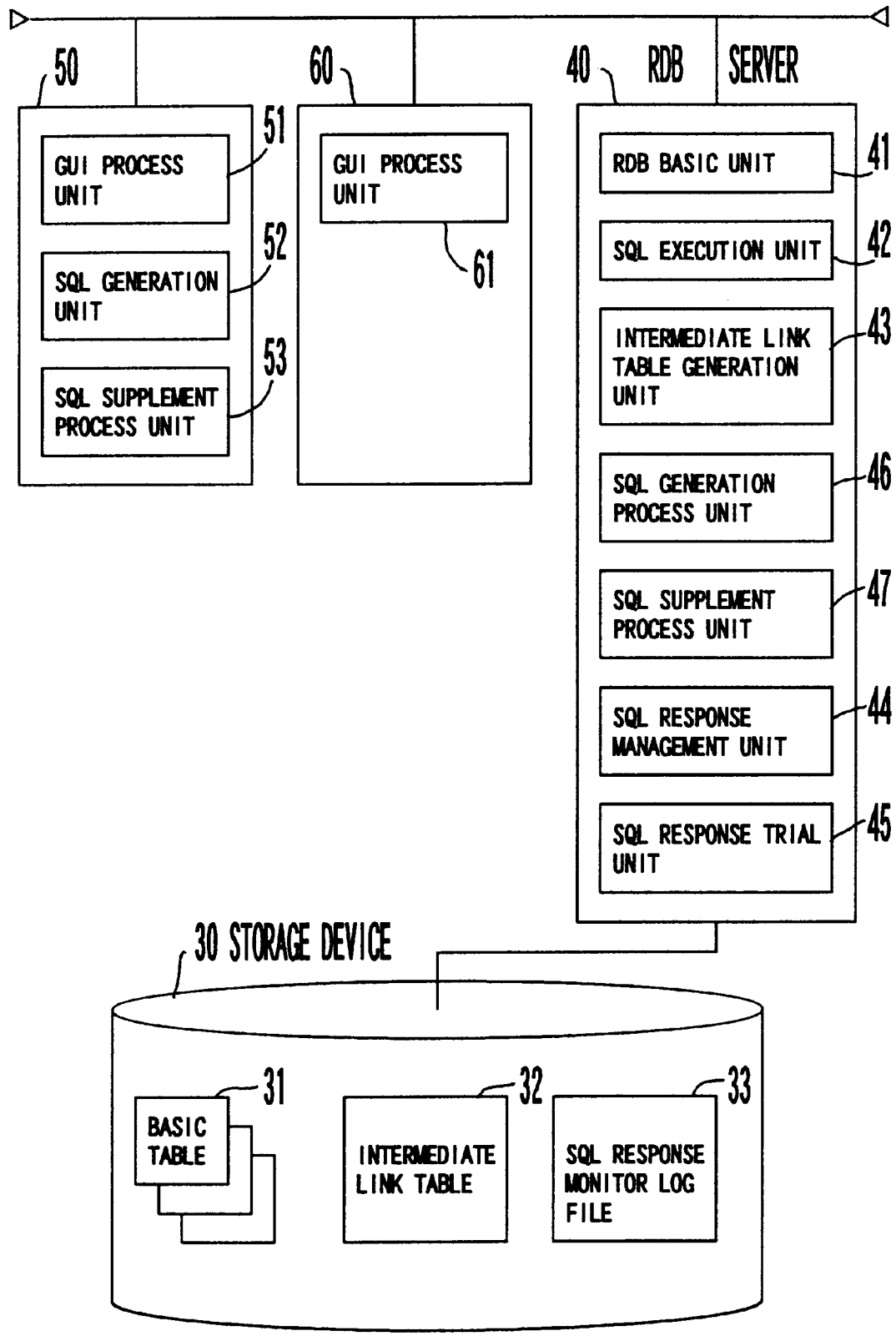
FIG. 3 shows the configuration (2) according to the present invention.

FIG. 3 shows an example of the configuration (2) of the relational database system according to the present invention.

In FIG. 3, a client 50 comprises a GUI process unit 51, an SQL generation process unit 52, and an SQL supplement process unit 53, and has a configuration similar to that of the client 20 shown in FIG. 2.

An RDB server 40 comprises an RDB basic unit 41, an SQL execution unit 42, an intermediate link table generation unit 43, an SQL response management unit 44, and an SQL response trial unit 45. The configuration is the same as that of the RDB server 10 shown in FIG. 2. The RDB server 40 further comprises an SQL generation process unit 46 and an SQL supplement process unit 47 similar to the units in the client 50. Thus, using the SQL generation process unit 46 and the SQL supplement process unit 47 as common applications on the server side, the user can utilize the functions of the present invention even if the user terminal only has a GUI process unit 61 such as a client 60.

FIG. 4 shows an example of the configuration of the hardware of the RDB servers 10 and 40, or the clients 20, 50, and 60.

Although an example of the configuration of the hardware of the clients 20, 50, and 60 is shown in FIG. 4, the configuration of the hardware of the RDB servers 10 and 40 is almost the same as the clients 20, 50, and 60 except that the RDB servers 10 and 40 can omit an input unit 72 and a display unit 73.

In FIG. 4, a CPU 71 is a central processing device for controlling the entire system.

The input unit 72 has a keyboard, a mouse, etc.

The display unit 73 displays a menu, etc. through the GUI process unit 21, etc.

A memory 74 such as RAM, etc. temporarily stores a program, data, etc. when, for example, an application program described later is activated to perform a process through the SQL generation process unit 22, the SQL supplement process unit 23, etc.

A storage unit 75 is, for example, a hard disk drive (HDD), etc. for storing an operation system (OS), various application programs (at least an application program for realizing a function provided by the present invention).

A storage medium drive unit 76 reads a program, data, etc. stored in a portable storage medium 76a such as an FD, CD-ROM, etc., writes data to the portable storage medium 55, etc. under the control of the CPU 71, and is, for example, a floppy disk drive (FDD), CD-ROM, etc.

The portable storage medium 76a is a portable storage medium for storing, in a format in which a program can be read by the storage medium drive unit 76 and can be executed by the CPU 71, at least an application program which realizes a function (of the SQL generation process unit 22, the SQL supplement process unit 23, etc.) provided by the present invention.

A communications unit 77 is connected to a network 4 such as a LAN, etc. and transmits and receives data to and from the RDB server 10, etc.

The above described application program is not limited to those stored in the storage unit 75, the portable storage medium 76a, etc. Using the communications functions through the communications unit 77, the above described application program, etc. can be received and stored after being transferred as necessary from another client 20, RDB server 10, or other devices (not shown in the drawings) connected through the network 4 such as a LAN, etc.

FIG. 5 shows an example of the link between basic tables of a relational database used to explain the embodiments of the present invention.

The table TECT shown in FIG. 5 is a table relating to technology, and has a figure number field ZUB, a classification field BUN, a name field MEI, etc. The table IPPANT is a table relating to a common symbol, and has a circuit symbol field KAI, a figure number field ZUB, a registration date field TNEN, etc. The table SOURCET is a product information table for each circuit symbol, and has a circuit symbol field KAI, a base rank field KRAN, an added arrangement number field TEHS, an arrangement number field TEH, a field GAI indicating whether or not a product is externally purchased, an added product number field HINS, a manufacturer's abbreviation field MAK, etc. A table MAKER is a table relating to a manufacturer of a product, and has a manufacturer's abbreviation field MAK, a manufacturer's name English representation field MAKM, a manufacturer's name Japanese representation field MAKK, a registrar's name field MTOU, etc.

Among the tables, a common field name is assigned to the fields relating to the same target. The table TECT and the table IPPANT have a common field ZUB. The table IPPANT and the table SOURCET have a common field KAI. The table SOURCET and the table MAKER have a common field MAK. Thus, the relationship between two tables having a common field is referred to as a primary link.

Since the table TECT and the table SOURCET have no common field, there is no primary link between these two tables. There is a primary link between the table TECT and the table IPPANT through a common field ZUB. Similarly, there is a primary link between the table IPPANT and the table SOURCET through a common field KAI. Therefore, the table TECT and the table SOURCET are linked through the table IPPANT. This is referred to as a secondary link.

Similarly, there is a secondary link between the table IPPANT and the table MAKER.

Furthermore, the table TECT and the table MAKER are linked through the table IPPANT and the table SOURCET. This is referred to as a tertiary link.

[1] Intermediate Link Table Generation Process

FIG. 6 shows an example of an intermediate link table generated by an intermediate link table generation unit.

The intermediate link table generation unit 13 automatically generates an intermediate link table shown in FIG. 6 when there is a basic table of the relational database shown in FIG. 5. An intermediate link table stores a source table name, a destination table name, a link table name, and a link condition for each entry (record).

An source table name indicates the table name of a basic table (source table), that is, a base of a link. A destination table name indicates the table name of a basic table (destination table), that is, a linked-to table. A link table name indicates the table name of a basic table (link table) through which a source table and a destination table are linked in the chain through a common field.

A link condition defines a link between a source table and a destination table, and includes the information indicating the primary link between tables and combinations of the primary links. The information indicating the primary link is defined by a source table name, a destination table name, and a name of a common field which is a key to the primary link.

In FIG. 6, TECT.ZUB=IPPANT.ZUB in the link condition (a) shown in a table indicates that the table TECT and the table IPPANT are linked through a common field ZUB.

In the link condition (b), TECT.ZUB=IPPANT.ZUB, IPPANT.KAI=SOURCET.KAI indicates that there is no primary link directly between the table TECT and the table SOURCET, but these tables are linked through the table IPPANT. This link condition is a combination of the link condition indicating the primary link between the TECT and the IPPANT (the TECT and the IPPANT are linked through the ZUB) and the link condition indicating the primary link between the IPPANT and the SOURCET (the IPPANT and the SOURCET are linked through the KAI).

The practical explanation about the method of generating an intermediate link table shown in FIG. 6 is described below by referring to FIGS. 7 through 13.

FIG. 7 is a flowchart of an intermediate link table generation process.

The intermediate link table generation unit 13 performs the process shown in FIG. 7 when the basic table 31 of a new relational database is generated or when the configuration of the basic table 31 in an existing relational database is amended.

In step S1 through S4 in FIG. 7, the primary link information is set. In step S1, it is determined for, and starting with, each of all basic tables managed in the relational database whether or not the attribute of a field in a table is found in another table. If a field having the same name and attribute is found, then control is passed to step S2, and a source table name (original table), a destination table name (another table), and a link condition are set and defined in the intermediate link table.

When there are no fields having the same name and attribute, control is passed to step S3 and a source table name (originating table), a destination table name (another table), and 'no direct link' as a link condition are set and defined in the intermediate link table.

It is determined in step S4 whether or not the primary link process has been completed for all tables, and all processes in steps S1 through S3 are repeated until the process is completed.

The processes in steps S1 through S3 are performed as follows. That is, the intermediate link table generation unit 13 extracts a combination of the basic tables 31. Then, the intermediate link table generation unit 13 defines a link condition when there is a primary link between the originating table (source table) and another table (destination table). That is, when there is a common field between the source table and the destination table, a link condition is generated using each table name and the common field name. For the combination of a source table and a destination table in which there is not a primary link defined between the source table and the destination table, "no direct link" is set in the link condition column.

FIGS. 8A and 8B show examples of the primary link relating to the above described steps S1 through S3.

There are primary links indicated by ① shown in FIG. 8A among the basic tables <TECT>, <IPPANT>, <SOURCET>, and <MAKER>. FIG. 8B clearly shows the primary link that there are the primary links between <TECT> and <IPPANT>, <IPPANT> and <SOURCET>, <SOURCET> and <MAKER>, and that there is no primary link between <TECT> and <SOURCET> or <IPPANT> and <MAKER>.

FIG. 9 shows an example of an intermediate link table in which the primary link is defined in steps S1 through S3. ① shown in FIG. 9 indicates that the combination of the tables implies a primary link.

When the above described steps S1 through S4 are completed in FIG. 7, the process of N-th link (N≧2) is started.

First, in step S5, N=2 is set.

Then, in step S6, records having a link condition "no direct link" (entry in an intermediate link table) are sequentially retrieved from the intermediate link table (FIG. 9). When a record having 'no direct link' is detected (yes in step S6), control is passed to step S7. If there are no more records having a link condition 'no direct link' (no in step S6), then the intermediate link table generation process terminates.

It is checked in step S7 whether or not there are two records which link the source table and the destination table of the record (target record) having a link condition "no direct link". For example, the record shown in FIG. 9 (having a source table name TECT and a destination table name SOURCET) has a link condition "no direct link". However, it can be linked using the link condition (primary link) of a record having a source table name TECT and a destination table name IPPANT and a record having a source table name IPPANT and a destination table name SOURCET (secondary link). When the target record can be linked using two records, then control is passed to step S8. When the target record cannot be linked, then control is passed to step S9.

As described above, in the secondary link process, the intermediate link table generation unit 13 defines a new link from two primary links one of which has a destination table functioning as source table for another primary link.

Figure 10:
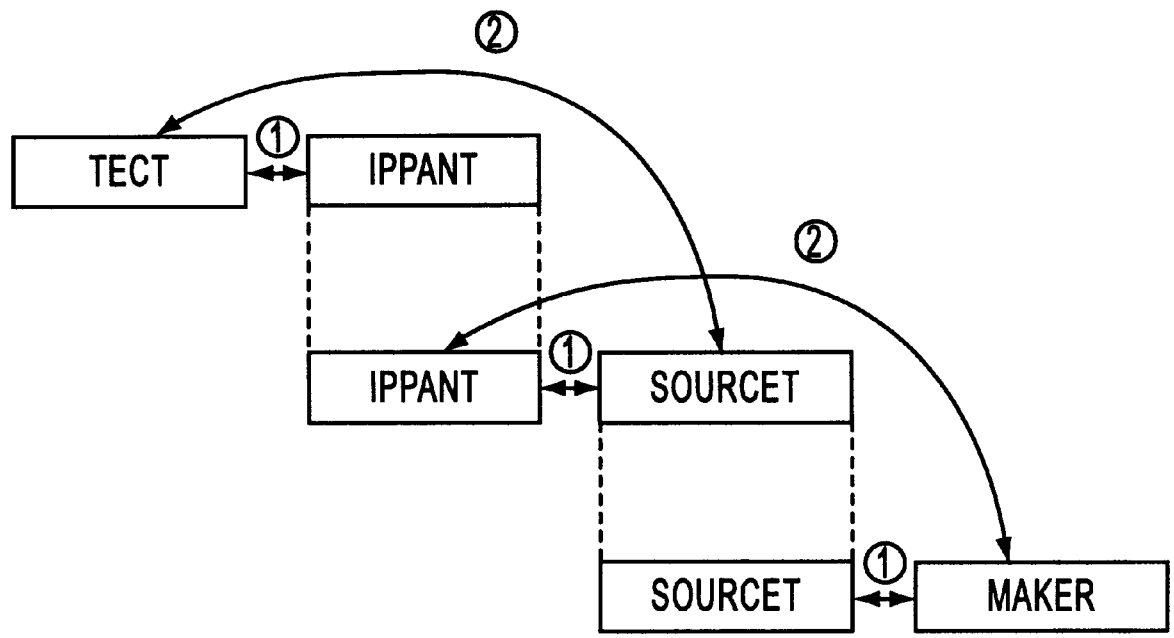
FIG. 10 shows an example of the secondary link.

FIG. 10 shows an example of a secondary link generated from two primary links.

As shown in FIG. 10, if there are primary links (marked ① in FIG. 10) between TECT and IPPANT, IPPANT and SOURCET, and SOURCET and MAKER, then a new link can be defined between TECT and SOURCET through IPPANT. Similarly, a new link can be defined between IPPANT and MAKER through SOURCET.

In step S8, the name of an intermediate table (IPPANT in the above described example) which relates a source table to a destination table is set in the link table name column of the target record, and a link condition extracted from the two records is set in the link condition column.

It is determined in step S9 whether or not the N-th link process has been completed for all records in the intermediate link table. If there is an unprocessed record, then control is returned to step S6, and the process is similarly repeated.

FIG. 11 shows an example of an intermediate link table in which the secondary link shown in FIG. 10 has been defined (set).

Practically, the link condition "TECT.ZUB= IPPANT.ZUB" between TECT and IPPANT and the link condition "IPPANT.KAI=SOURCET.KAI" between IPPANT and SOURCET are obtained from the link condition in the intermediate link table. From the obtained link conditions, the link condition "TECT.ZUB=IPPANT.ZUB, IPPANT.KAI=SOURCET.KAI" between TECT and SOURCET is defined. Similarly, the link condition between IPPANT and MAKER can be defined as "IPPANT.KAI= SOURCET.KAI, SOURCET.MAK=MAKER.MAK". Thus, when new secondary link can be defined between other tables, each link condition is stored in the intermediate link table.

The name of an intermediate basic table is set in the link table name column in the intermediate link table.

When the N-th link process is completed, it is determined in step S10 whether or not the entire link process has been completed. If there are no more records having a link condition "no direct link", and if a new link cannot be set, then it is determined that all link processes have been completed and the intermediate link table generation process terminates.

When a new link can be set, 1 is added to N in step S11, control is returned to step S6, and the N-th link process is similarly repeated.

In the example shown in FIG. 11, after the secondary link process has been completed, control is returned to step S6, and the tertiary link is performed.

Figure 12:
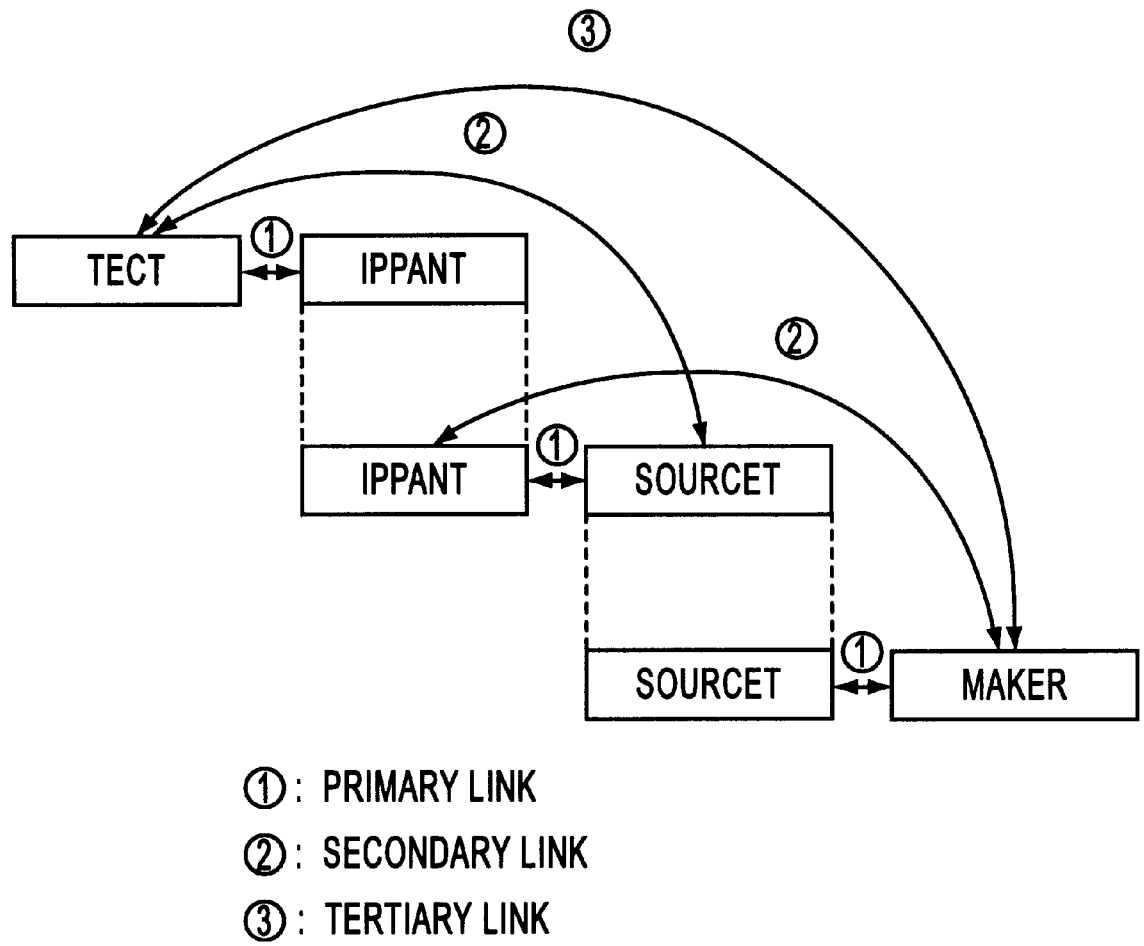
FIG. 12 shows an example of the tertiary link.

FIG. 12 shows an example of the tertiary link generated from the primary link and the secondary link. As shown in FIG. 12, the link condition between TECT and MAKER can be defined through the common SOURCET using the secondary link between TECT and SOURCET and the primary link between SOURCET and MAKER. This is referred to as the tertiary link (marked ③ in FIG. 12). The contents of the process is similar to those shown in FIG. 10.

FIG. 13 shows an example of an intermediate link table after the tertiary link has been defined.

The link condition "TECT.ZUB=IPPANT.ZUB, IPPANT.KAI=SOURCET.KAI" between TECT and SOURCET and the link condition "SOURCET.MAK= MAKER.MAK" between SOURCET and MAKER are obtained from the intermediate link table, and the link condition "TECT.ZUB=IPPANT.ZUB, IPPANT.KAI= SOURCET.KAI, SOURCET.MAK=MAKER.MAK" between TECT and MAKER is defined. Similarly, the link condition between MAKER (source table) and TECT (destination table) is defined.

[2] SQL Automatic Generation Process

The SQL automatic generation process performed by the SQL generation process unit 22 is described by referring to FIGS. 14 through 18.

The user has to only input minimal selection information such as a retrieval item, condition item, etc. using the GUI process unit 21 of the client 20 so that an optimum SQL retrieval can be performed without knowledge about the table structure, etc. of the relational database.

Figure 14:
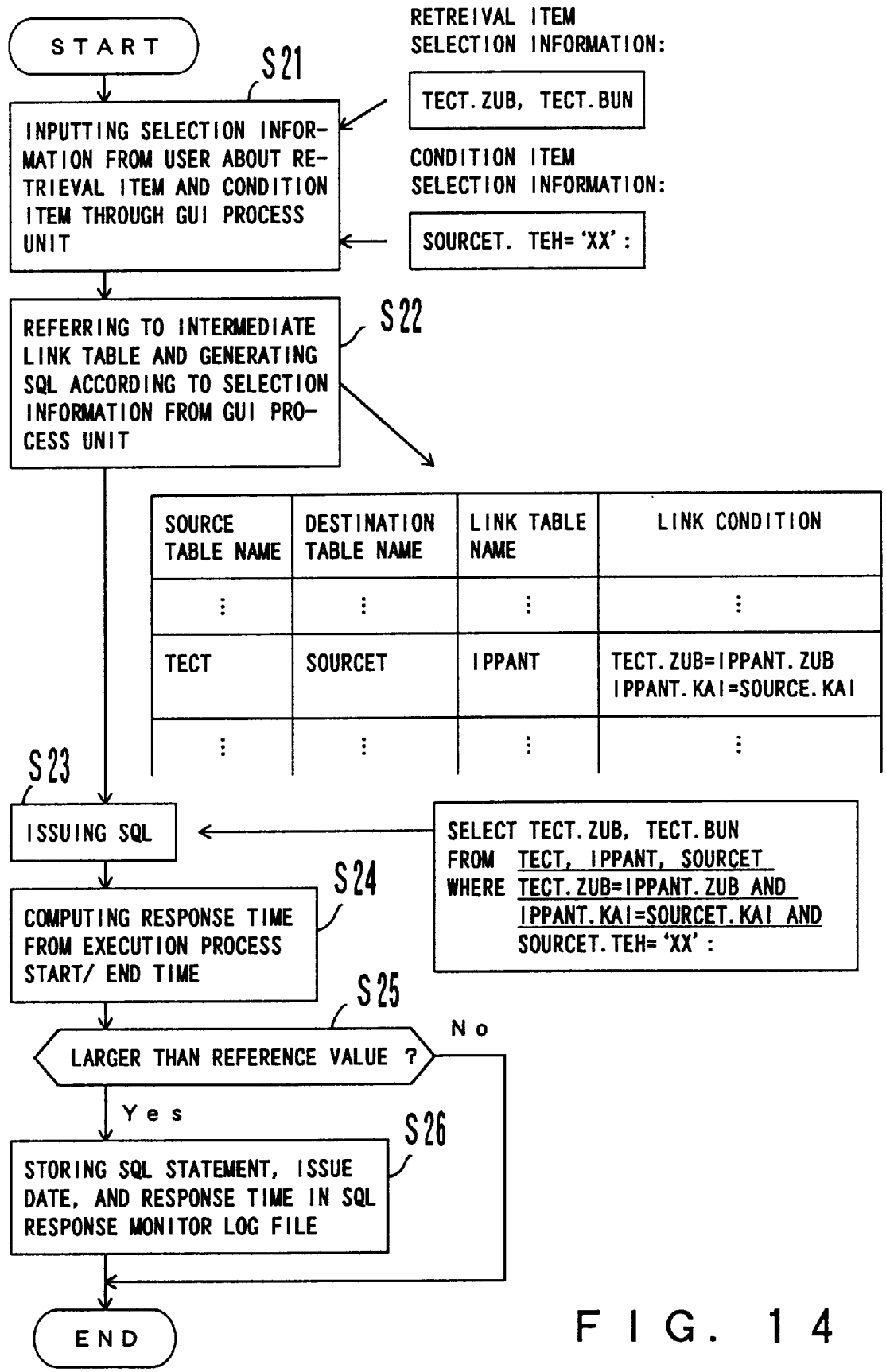
FIG. 14 is a flowchart showing an SQL generation process.
Figure 17:
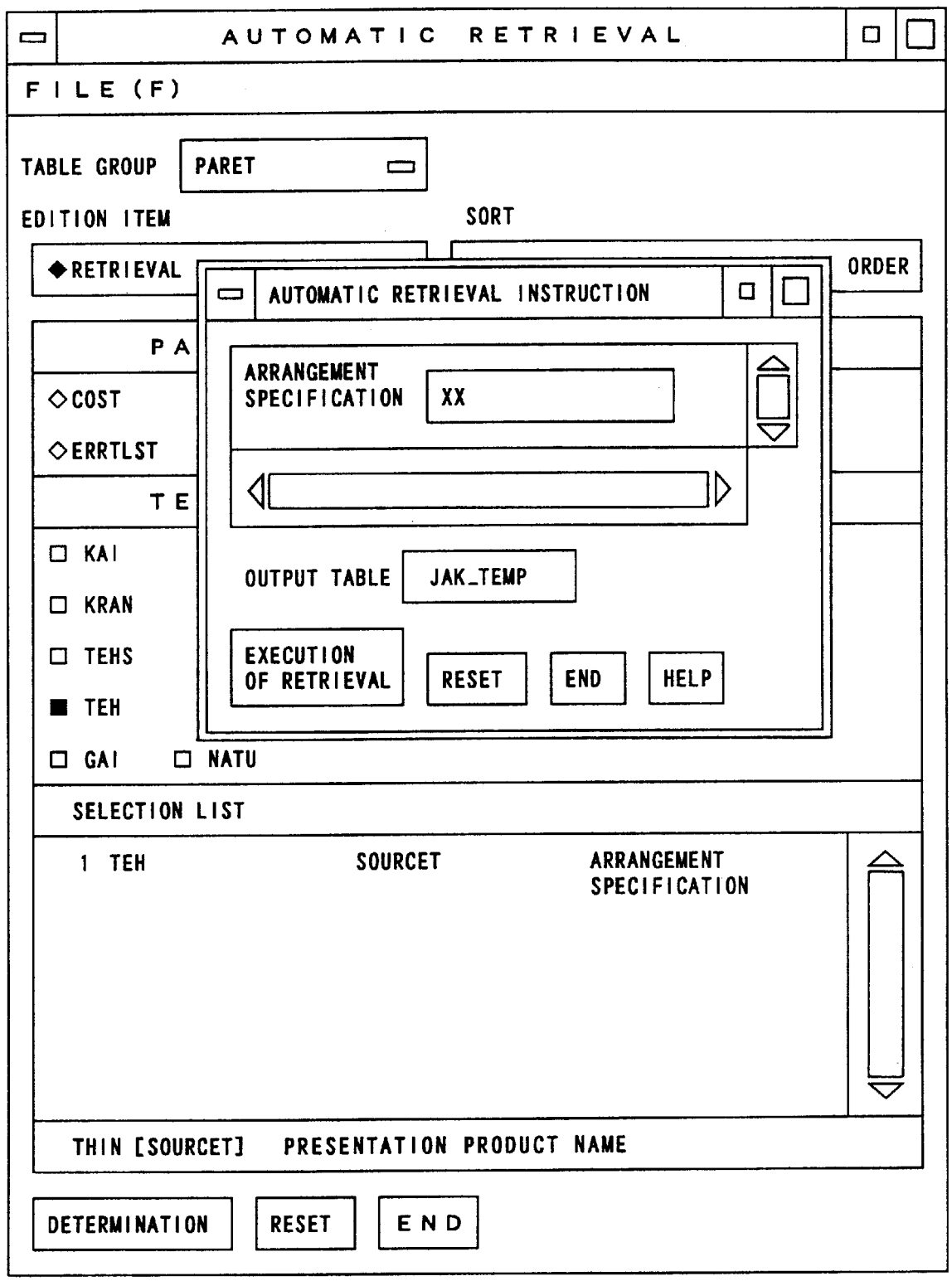
FIG. 17 shows an example (3) of an input screen of the GUI process unit.

FIG. 14 is a flowchart of the SQL generation process. FIGS. 15 through 17 show examples of input screens of a GUI process unit. Especially, FIG. 15 shows an example of a screen on which a retrieval item is selected and input. FIG. 16 shows an example of a screen on which a retrieval item is selected and input. FIG. 17 shows an example of a screen on which a data value of a retrieval condition field is input.

At a request to search a relational database, the GUI process unit 21 displays a screen on which retrieval is performed as shown in FIG. 15. On the screen shown in FIG. 15, a preliminarily classified table group to be retrieved from the relational database is specified in an input field of a table group. The 'RETRIEVAL', 'CONDITION', and 'SORT' in the specification field of an edition item respectively indicate whether or not a retrieval item can be input, a retrieval condition can be input, or data can be rearranged. When 'SORT' is specified, an ascending order or a descending order can be specified for rearrangement.

In specifying a retrieval item, one or more retrieval items can be specified in the table LIST and the field LIST.

Described below is the process flow about an example of the case where a user specifies the retrieval of the information in the field ZUB (figure number) and the field BUN (classification) in the table TECT using the value "XX" of the field TEH (arrangement number) in the table SOURCET as a key.

First, in step S21 in FIG. 14, the GUI process unit 21 displays an input screen shown in FIG. 15 through 17 and the user inputs selected retrieval and condition items.

In the example shown in FIG. 15, the retrieval item for a target table group is PARET, a target table name is TECT, and target field names are ZUB and BUN. When the 'CONFIRMATION' button at the lowest row on the screen is pressed, a list of retrieval items is displayed in the area 'SELECTION LIST'.

When the user clicks the mouse button for the 'CONDITION' as an edition item, a retrieval condition can be specified. In FIG. 16, the table name SOURCET and the field name TEH are specified as condition items in the TABLE LIST and the FIELD LIST respectively. When the 'CONFIRMATION' button is pressed, a dialog box as shown as an 'AUTOMATIC RETRIEVAL SPECIFICATION' in FIG. 17 is displayed, and a retrieval value of the field TEH can be input. The "XX" is input in this example. If necessary, an output table can be specified. When the 'EXECUTION OF RETRIEVAL' button is pressed, control is passed to the subsequent steps.

In step 22 shown in FIG. 14, the retrieval item selection information "TECT.ZUB, TECT.BUN" and the condition item selection information "SOUCET.TEH='XX'" are passed from the GUI process unit 21 to the SQL generation process unit 22. The SQL generation process unit 22 receives the information in the intermediate link table 32 from the RDB server 10, and automatically generates an SQL statement at a request from the user by referring to the information.

Practically, the SQL generation process unit 22 generates a SELECT phase of "SELECT TECT.ZUB, TECT.BUN" according to the retrieval item selection information from the GUI process unit 21, and generates a WHERE (retrieval condition) phase of "WHERE SOURCET.TEH='XX'" according to the condition item selection information. Since the SQL statement is still incomplete, the information which links the retrieval (extraction) item 'table TECT' and the condition item 'table SOURCET' is retrieved from the intermediate link table 32. Then, the specification of the related table name of "FROM TECT, IPPANT, SOURCET", and the description of "TECT. ZUB=IPPANT.ZUB AND IPPANT.KAI=SOURCET.KAI" as a link condition are generated. Finally, the following optimum SQL statement is automatically generated.
"SELECT TECT.ZUB,TECT.BUN
FROM TECT,IPPANT,SOURCET
WHERE TECT.ZUB=IPPANT.SUB AND IPPANT.KAI= SOURCET.KAI AND SOURCET.TEH='XX'"

An outstanding difference from the conventional GUI process unit for providing an inflexible retrieval function is described below. That is, the prior art technology retrieves only a specific retrieval item and a specific condition item prepared in a sample SQL statement by a GUI process unit whereas the present invention can flexibly retrieve optional retrieval items and condition items independent of a table structure or field information.

Furthermore, an outstanding difference from the conventional GUI process unit for providing a more flexible retrieval function is described below. That is, in the prior art technology, the user should correctly specify a link table containing all links between retrieval items and condition items such as IPPANT as shown in the above described example, and a link condition. On the other hand, since the present invention uses an intermediate link table 32, the user need not specify them. That is, the user can successfully use a relational database with minimal knowledge without fully knowing the relationship between the tables and fields.

In step S23, a generated SQL statement is transmitted to the RDB server 10, and the SQL execution unit 12 executes the SQL statement. The execution result of the SQL statement is presented to the user through the GUI process unit 21.

In step S24, the SQL response monitor unit 14 measures the time taken from the start to the end of the execution of the SQL statement to compute the response time.

In step S25, it is determined whether or not the response time computed in step S24 has exceeded a predetermined reference value, for example, 1 second. If it has exceeded the predetermined value, then the executed SQL statement, the issue date, and the response time are stored in the SQL response monitor log file 33 in step S26.

These processes are performed to improve the performance of an SQL statement in an SQL response trial process described below by referring to FIG. 19.

FIG. 18 shows an example of the configuration of an SQL response monitor log file for storing an SQL statement, its issue date and time, response time, existence/non-existence of trial, etc.

The GUI process unit 21 does not generate a screen as shown in FIGS. 15 through 17 exclusively for a specific relational database, but for general use for an optional relational database. That is, when a new relational database is developed, or when the structure of a relational database is amended, the function of optionally searching a relational database can be provided for the user according to the table name and the field name in the relational database without changing the GUI process unit 21.

[3] SQL Response Trial Process

In the above described example of an SQL statement, the retrieval condition can be specified either "WHERE TECT.ZUB=IPPANT.ZUB, . . . " or "WHERE IPPANT.ZUB=TECT.ZUB, . . . ". That is, the same retrieval result can be obtained even if the left part and the right part replace each other. However, the retrieval response time largely depends on the structure of a table, the actual number of pieces of data, etc. Therefore, to automatically generate a rapid-response SQL statement, the link condition in the intermediate link table 32 is optimized by the SQL response trial unit 15.

Figure 19:
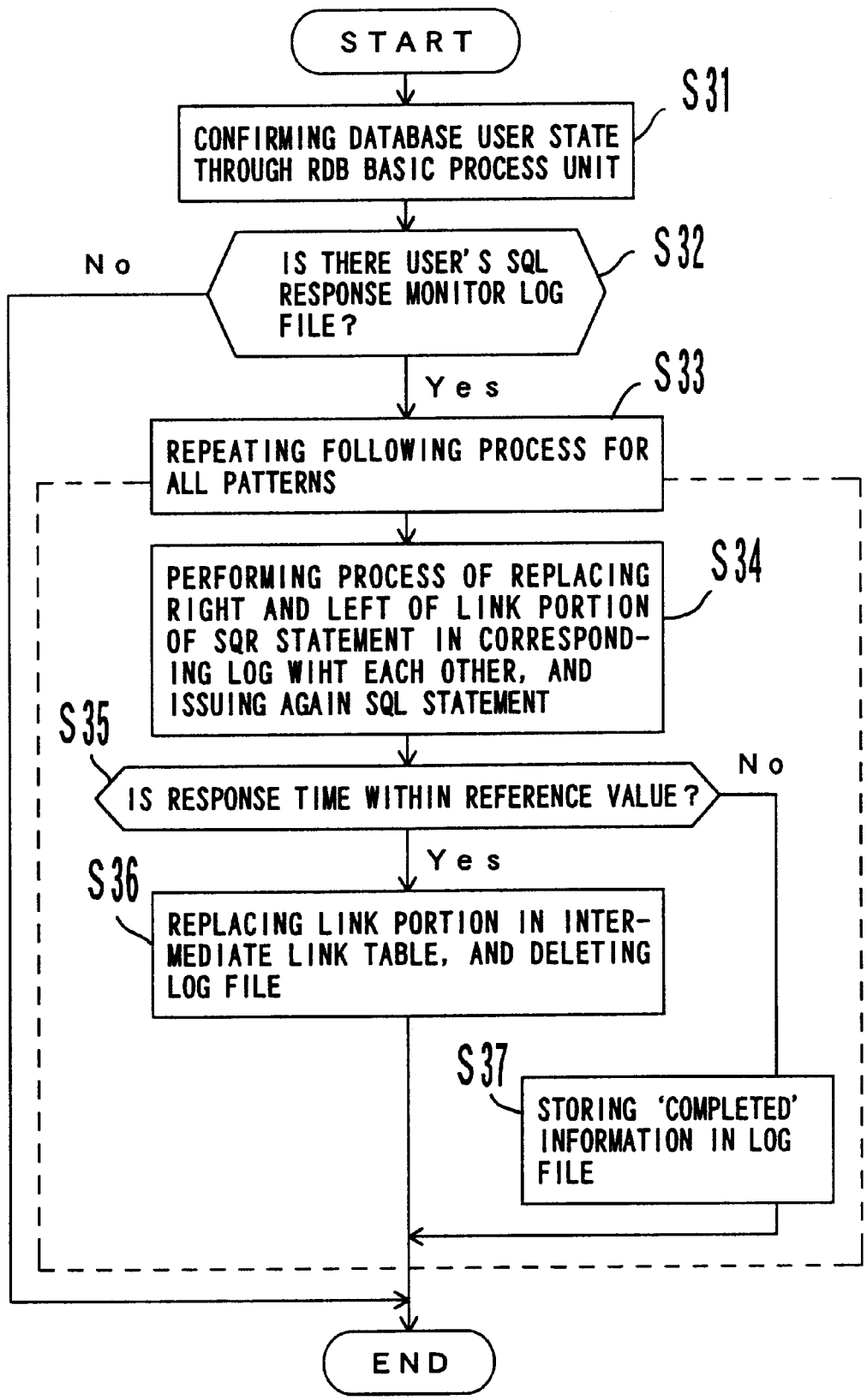
FIG. 19 is a flowchart showing the SQL response trial process.

FIG. 19 is a flowchart of the SQL response trial process.

In step S31, the RDB basic process unit 11 confirms the state of a database user, and performs the following processes at an optimum timing.

In step S32, it is determined whether or not there is the SQL response monitor log file 33 of a database user. If yes, control is passed to step S63. If not, the process terminates.

In step S33, the processes in steps S34 through S37 are repeated for all patterns of the SQL statement stored in the SQL response monitor log file 33.

In step S34, the SQL statement issue process is performed again with the left side and the right side of the link condition replaced with each other in the retrieval condition of the SQL statement in the corresponding log.

In step S35, it is determined whether or not the response time is within a predetermined reference value, for example, one second. If the response time in the process is within a reference time, control is passed to step S36. If it exceeds the reference time, control is passed to step S37. Instead of determining whether or not the response time is within a predetermined reference value, the response time can be compared with, for example, the response time stored in the SQL response monitor log file 33. If the response time obtained when the left part and the right part of the link condition replace each other is shorter than the response time before the replacement, then control is passed to step S36. If it is longer, control is passed to step S37.

In step S36, the left part and the right part of a corresponding link condition in the intermediate link table 32 are replaced with each other in such a way that the same link condition of the SQL statement executed in step S37 can be obtained. Then, the SQL response monitor log file 33 is removed.

In step S37, "termination" is recorded in a corresponding entry in the SQL response monitor log file 33.

[4] User-generated SQL Check and Supplement Process

When checking and correcting an existing SQL statement is required in addition to the automatic generation of an SQL statement by the SQL generation process unit 22 according to the selection information input through the GUI process unit 21, the SQL supplement process unit 23 can check and correct an SQL statement.

Figure 20:
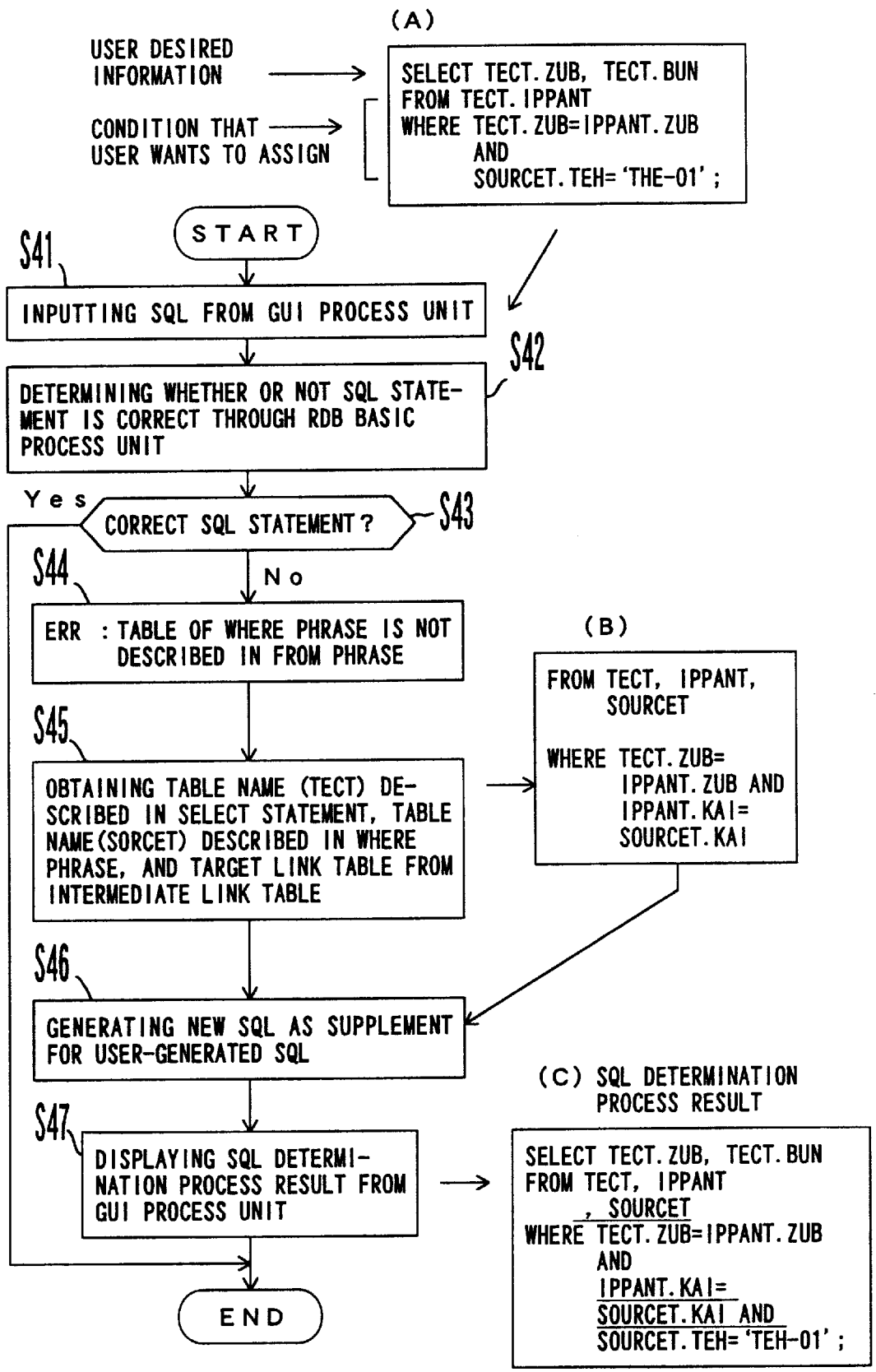
FIG. 20 is a flowchart showing a user-generated SQL check and a supplement process.

FIG. 20 is a flowchart of the user-generated SQL check and supplement process for checking a user-generated SQL statement and correcting it into an appropriate SQL statement.

In step S41, a user-generated SQL query statement is input through the GUI process unit 21. In this example, it is assumed that an SQL statement such as the one indicated by (A) shown in FIG. 20 is input.

In step S42, the input SQL statement is issued. The RDB basic process unit 11 determines whether or not the SQL statement is correct.

In step S43, it is determined according to the result of the check performed by the RDB basic process unit 11 whether or not the SQL statement is correct. If it is not a correct SQL statement, control is passed to step S44. If it is a correct SQL statement, the process terminates.

In step S44, the SQL supplement process unit 23 checks the error information (ERR) from the RDB basic process unit 11. When the ERR indicates that the table of the WHERE phrase is not described in the FROM phrase, the following processes are performed.

In step S45, the table name (TECT) described in the SELECT statement, the table name (SOURCET) described in the WHERE statement, and the target link table are obtained from the intermediate link table 32.

In step S46, according to the link table obtained from the intermediate link table 32 and the information about the link condition, the user-generated SQL is supplemented to generate a new SQL. In this example, the table name of "IPPANT" is added to the FROM phrase which is insufficiently described, and the condition of "AND IPPAN.KAI= SOURCE.KAI" is added to the WHERE phrase.

In step S47, the GUI process unit 21 displays an SQL determination process result on the screen. The user can store a new SQL statement as necessary, amend it, and request the RDB server 10 to execute it.

If descriptions of a link condition, etc. are lacking when the user generates an SQL statement as described above, only an error message is output during the execution of the SQL statement according to the conventional technology whereas a correct SQL statement is presented to the user, and the user can retrieve data using the SQL statement and understand the relationship between tables, etc. according to the present invention.

As described above, according to the present invention, even a user who is not familiar with an SQL statement or the relationships between tables in a relational database can be provided with an optimum and flexible general-purpose retrieval means.

The user of a table can easily obtain necessary information without knowing the links between tables or the method for correctly describing the SQL as long as the user has the minimal knowledge as to which table stores the desired information and the information about the retrieval condition.

What is claimed is:

1. A relational database search system, comprising:
   an intermediate link table generating device automatically generating an intermediate link table containing link information about a relationship between a table and another table directly or indirectly related to each other through a common field, by obtaining an indirect link condition for linking tables which cannot be directly linked based on a link condition of tables which can be directly linked; and
   an intermediate link table storage device storing the generated intermediate link table.

2. The system according to claim 1, further comprising:
   query statement generation process device referring to the link information stored in the intermediate link table according to input selection information and automatically generating a query statement by extracting a name of a necessary table for a query and a condition, when the selection information is input for use in a relational database query process.

3. The system according to claim 2, further comprising:
   a query statement trial process device executing a query statement including the link information contained in the intermediate link table as a condition, measuring a response time of the query statement, and updating the link information contained in the intermediate link table in such a way that the response time can be shortened.

4. The system according to claim 2, further comprising:
   a query statement response monitor device measuring an execution response time of the query statement, and storing, in a monitor log, information about a response of the query statement when the execution response time exceeds a predetermined time when the query statement including the link information contained in the intermediate link table as a condition is executed; and
   a query statement trial process device executing a query statement obtained by changing a query condition of the query statement stored in the monitor log onto another representation within a range in which an equal query result can be obtained, and updating a corresponding condition in the link information in the intermediate link table into the other representation when a response time of the executed query statement is shorter than a predetermined time or a response time stored in the monitor log.

5. The system according to claim 1, further comprising:
   a query statement supplement process device for determining whether or not a query statement referring to a relational database is correct, referring to the link information in the intermediate link table when the input query statement is not correct, and automatically correcting the input query statement by adding a name of a necessary table for a query or a condition.

6. A relational database search system, comprising:
   a basic table storage device storing a plurality of basic tables to be searched;
   an intermediate link table generation device automatically generating an intermediate link table indicating a link condition for directly or indirectly linking two optional basic tables stored in said basic table storage device, by obtaining an indirect link condition for linking basic tables which cannot be directly linked based on a link condition of basic tables which can be directly linked; and
   an intermediate link table storage device for storing the intermediate link table generated by said intermediate link table generation device.

7. The system according to claim 6, wherein said intermediate link table generation device automatically generates the intermediate link table by obtaining an indirect link condition for linking basic tables which cannot be directly linked based on a link condition of basic tables which can be directly linked.

8. The system according to claim 6, further comprising:
   an SQL generation process device automatically generating a structured query language (SQL) statement according to input selection information by referring to the intermediate link table stored in said intermediate link table storage device.

9. The system according to claim 8, further comprising:
   a SQL response trial device allowing a quicker-response structured query language (SQL) statement to be automatically generated when a plurality of SQL statements which outputs an equal search result can be generated according to the input selection information.

10. The system according to claim 9, wherein
    when a response time of the structured query language (SQL) statement generated by said SQL generation process device according to the input selection information is longer than a reference time, said SQL response trial device generates another SQL statement which outputs a same search result as said SQL statement, and when a response time of the other SQL statement is within the reference time, the intermediate link table is updated.

11. The system according to claim 6, further comprising:
    input means for inputting a structure query language (SQL) statement; and
    SQL statement correction device determining whether or not the SQL statement input by said input means is correct, and correcting the SQL statement referring to the link condition in the intermediate link table when it is determined that the SQL statement is not correct.

12. A method of searching a relational database, comprising:

preliminarily generating an intermediate link table indicating a link condition for directly or indirectly linking two optional basic tables stored in a basic table storage device, by obtaining an indirect link condition for linking basic tables which cannot be directly linked based on a link condition of basic tables which can be directly linked;

automatically generating a structured query language (SQL) statement according to selection information by referring to the generated intermediate link table when the selection information is input, and obtaining a search result by issuing the generated SQL statement.

13. A method of generating an intermediate link table containing link information about a relationship between basic tables in a relational database, comprising:

extracting all combinations between basic tables to be linked;

storing in the intermediate link table as a primary link a relationship between basic tables directly linked to each other in the extracted combinations;

storing in the intermediate link table as a secondary link a combination of basic tables which cannot be directly linked to each other, but can be linked to each other through another basic table linked through the primary link to each of the combination of the basic tables; and generating the intermediate link table by obtaining a relationship between basic tables step by step using links previously obtained and stored in the intermediate link table until links can be obtained between all the extracted combinations of basic tables.

14. A method of automatically generating an intermediate link table containing link information about a relationship between tables in a relational database, comprising:

setting, in each entry in the intermediate link table to be generated, table names as a source table name and a destination table name in a link and setting a link condition using a common field name when a table and another table is directly related to each other through the common field; and setting, in each entry in the intermediate link table to be generated, table names of a table and another table as a source table name and a destination table name in a link when a table and another table is indirectly related to each other through one or more other tables using a common field, setting table names of the other one of more tables linking the tables as link table names, and setting a link condition using the common field between linked tables.

15. A computer-readable storage medium used to direct a computer to perform:

automatically generating an intermediate link table indicating a link condition for directly or indirectly linking two optional basic tables, by obtaining an indirect link condition for linking basic tables which cannot be directly linked based on a link condition of basic tables which can be directly linked.

16. A computer-readable storage medium used to direct a computer to perform:

automatically generating an intermediate link table indicating a link condition for directly or indirectly linking two optional basic tables, by obtaining an indirect link condition for linking basic tables which cannot be directly linked based on a link condition of basic tables which can be directly linked; and automatically generating a structured query language (SQL) statement according to input selection information by referring to the intermediate link table.

17. A computer-readable storage medium used to direct a computer to perform:

automatically generating an intermediate link table indicating a link condition for directly or indirectly linking two optional basic tables, by obtaining an indirect link condition for linking basic tables which cannot be directly linked based on a link condition of basic tables which can be directly linked; and determining whether or not an input structured query language (SQL) statement is correct, and correcting the input SQL statement referring to the link condition in the intermediate link table when it is determined that the input SQL statement is incorrect.

18. A computer-readable storage medium used to direct a computer to perform:

setting, in each entry in the intermediate link table to be generated, table names as a source table name and a destination table name in a link and setting a link condition using a common field name when a table and another table is directly related to each other through the common field; and setting, in each entry in the intermediate link table to be generated, table names of a table and another table as a source table name and a destination table name in a link when a table and another table is indirectly related to each other through one or more other tables using a common field, setting table names of the other one of more tables linking the tables as link table names, and setting a link condition using the common field between linked tables.

19. A relational database search system, comprising:

an intermediate link table generating device automatically generating an intermediate link table containing link information about a relationship between a table and another table related to each other through a common field directly or through one or more tables;

an intermediate link table storage device storing the generated intermediate link table; and a query statement supplement process device determining whether or not a query statement referring to a relational database is correct, referring to the link information in the intermediate link table when the input query statement is not correct, and automatically correcting the input query statement by adding a name of a necessary table for a query or a condition.

20. A relational database search system, comprising:

an intermediate link table generation device automatically generating an intermediate link table containing link information about a relationship between a table and another table related to each other through a common field directly or through one or more tables;

an intermediate link table storage device storing the generated intermediate link table;

a query statement generation process device referring to the link information stored in the intermediate link table according to input selection information and automatically generating a query statement by extracting a name of a necessary table for a query and a condition, when the selection information is input for use in a relational database query process; and a query statement trial process device executing a query statement including the link information contained in the intermediate link table as a condition, measuring a response time of the query statement, and updating the link information contained in the intermediate link table in such a way that the response time can be shortened.

21. A relational database search system, comprising:

an intermediate link table generation device automatically generating an intermediate link table containing link information about a relationship between a table and another table related to each other through a common field directly or through one or more tables;

an intermediate link table storage device storing the generated intermediate link table;

a query statement generation process device referring to the link information stored in the intermediate link table according to input selection information and automatically generating a query statement by extracting a name of a necessary table for a query and a condition, when the selection information is input for use in a relational database query process;

a query statement response monitor device measuring an execution response time of the query statement, and storing, in a monitor log, information about a response of the query statement when the execution response time exceeds a predetermined time when the query statement including the link information contained in the intermediate link table as a condition is executed; and a query statement trial process device executing a query statement obtained by changing a query condition of the query statement stored in the monitor log onto another representation within a range in which an equal query result can be obtained, and updating a corresponding condition in the link information in the intermediate link table into the other representation when a response time of the executed query statement is shorter than a predetermined time or a response time stored in the monitor log.

22. A relational database search system, comprising:

a basic table storage device storing a plurality of basic tables to be searched;

an intermediate link table generation device for automatically generating an intermediate link table indicating a link condition for directly or indirectly linking two optional basic tables stored in said basic table storage device; and an intermediate link table storing an intermediate link table generated by said intermediate link table generation device; wherein said intermediate link table generation device automatically generates the intermediate link table by obtaining an indirect link condition for linking basic tables which cannot be directly linked based on a link condition of basic tables which can be directly linked.

23. A relational database search system, comprising:

a basic table storage device storing a plurality of basic tables to be searched;

an intermediate link table generating device automatically generating an intermediate link table indicating a link condition directly or indirectly linking two optional basic tables stored in said basic table storage device;

an intermediate link table storage device storing an intermediate link table generated by said intermediate link table generator;

a SQL generation process device automatically generating a structured query language (SQL) statement according to input selection information by referring to the intermediate link table stored in said intermediate link table storage device; and a SQL response trial device allowing a quicker-response structured query language (SQL) statement to be automatically generated when a plurality of SQL statements which outputs an equal search result can be generated according to the input selection information.

24. The system according to claim 23, wherein when a response time of the structured query language (SQL) statement generated by said SQL generation process device according to the input selection information is longer than a reference time, said SQL response trial device generates another SQL statement which outputs a same search result as said SQL statement, and when a response time of the other SQL statement is within the reference time, the intermediate link table is updated.

25. A process of searching a relational database comprising:

creating an intermediate link table;

searching a plurality of data tables in a relational database;

identifying entries in the tables which can be primarily linked;

adding an entry in the intermediate link table including information corresponding to each primary link for each primary link;

identifying entries in the tables which can be secondarily and tertiarily linked; and adding an entry in the intermediate link table including information corresponding to each secondary link and each tertiary link.

* * * * *